(12) United States Patent
Sandhu et al.

(10) Patent No.: US 6,883,095 B2
(45) Date of Patent: Apr. 19, 2005

(54) SYSTEM AND METHOD FOR PASSWORD THROTTLING

(75) Inventors: Ravi Sandhu, Fairfax, VA (US); Colin deSa, Herndon, VA (US); Karuna Ganesan, Norcross, GA (US)

(73) Assignee: SingleSigon. Net Inc., Reston, VA (US)

(*) Notice: Subject to any disclaimer, the term of this patent is extended or adjusted under 35 U.S.C. 154(b) by 679 days.

(21) Appl. No.: 09/739,110

(22) Filed: Dec. 19, 2000

(65) Prior Publication Data

US 2002/0078350 A1 Jun. 20, 2002

(51) Int. Cl.⁷ .............................................. H04L 12/14
(52) U.S. Cl. .................................... 713/168; 713/202
(58) Field of Search ............................... 713/168–202

(56) References Cited

U.S. PATENT DOCUMENTS

| | | | | |
|---|---|---|---|---|
| 4,935,962 A | * | 6/1990 | Austin .......................... | 713/159 |
| 5,311,596 A | * | 5/1994 | Scott et al. .................... | 380/33 |
| 5,442,342 A | * | 8/1995 | Kung ........................... | 340/5.27 |
| 6,006,328 A | | 12/1999 | Drake | |
| 6,047,242 A | * | 4/2000 | Benson ......................... | 702/35 |
| 6,263,447 B1 | * | 7/2001 | French et al. ................. | 713/201 |
| 6,332,192 B1 | * | 12/2001 | Boroditsky et al. .......... | 713/168 |
| 6,535,980 B1 | * | 3/2003 | Kumar et al. ................. | 713/168 |
| 6,615,350 B1 | * | 9/2003 | Schell et al. ................. | 713/168 |
| 6,720,860 B1 | * | 4/2004 | Narayanaswami .......... | 340/5.54 |
| 2002/0002678 A1 | * | 1/2002 | Chow et al. .................. | 713/169 |

OTHER PUBLICATIONS

M–Tech Information Technology, Inc., "Consistant Authentication Processes", 2004, www.psynch.com/security/consistent-authentication-processes.html, entire document.*

* cited by examiner

Primary Examiner—Emmanuel L. Moise
Assistant Examiner—Ronald Baum
(74) Attorney, Agent, or Firm—Antonelli, Terry, Stout & Kraus, LLP

(57) ABSTRACT

A method for authenticating a user includes receiving a request for access from a user claiming to be a particular user. A first challenge having a first level of complexity is transmitted to the user. A response to the transmitted first challenge is transmitted. A determination is made as to whether or not the transmitted response authenticates the user as the particular user. The requested access by the user is allowed if the transmitted response authenticates the user. However, a second challenge having a second level of complexity, greater than the first level of complexity, is transmitted to the user if the transmitted response does not authenticate the user.

18 Claims, 11 Drawing Sheets

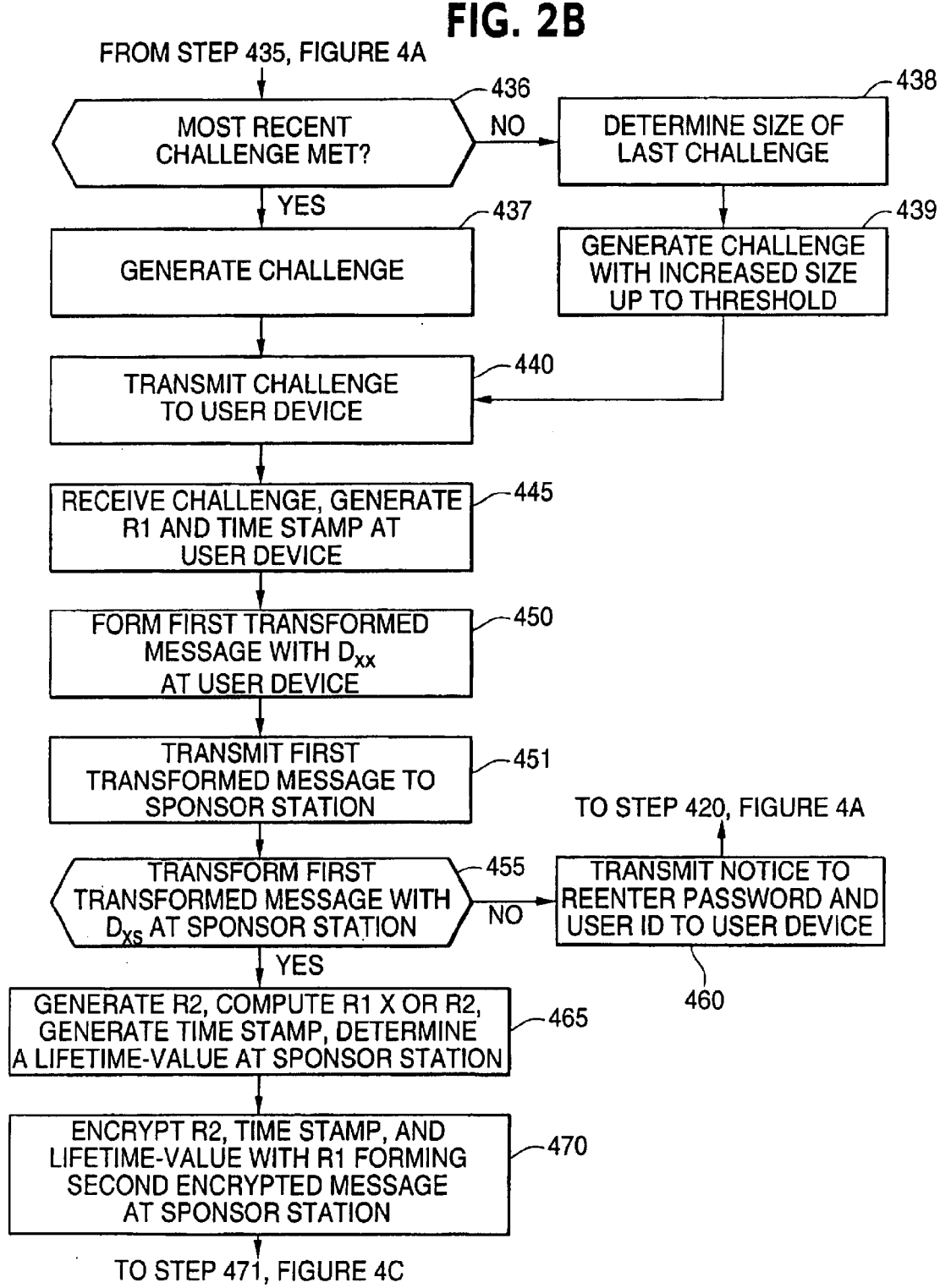

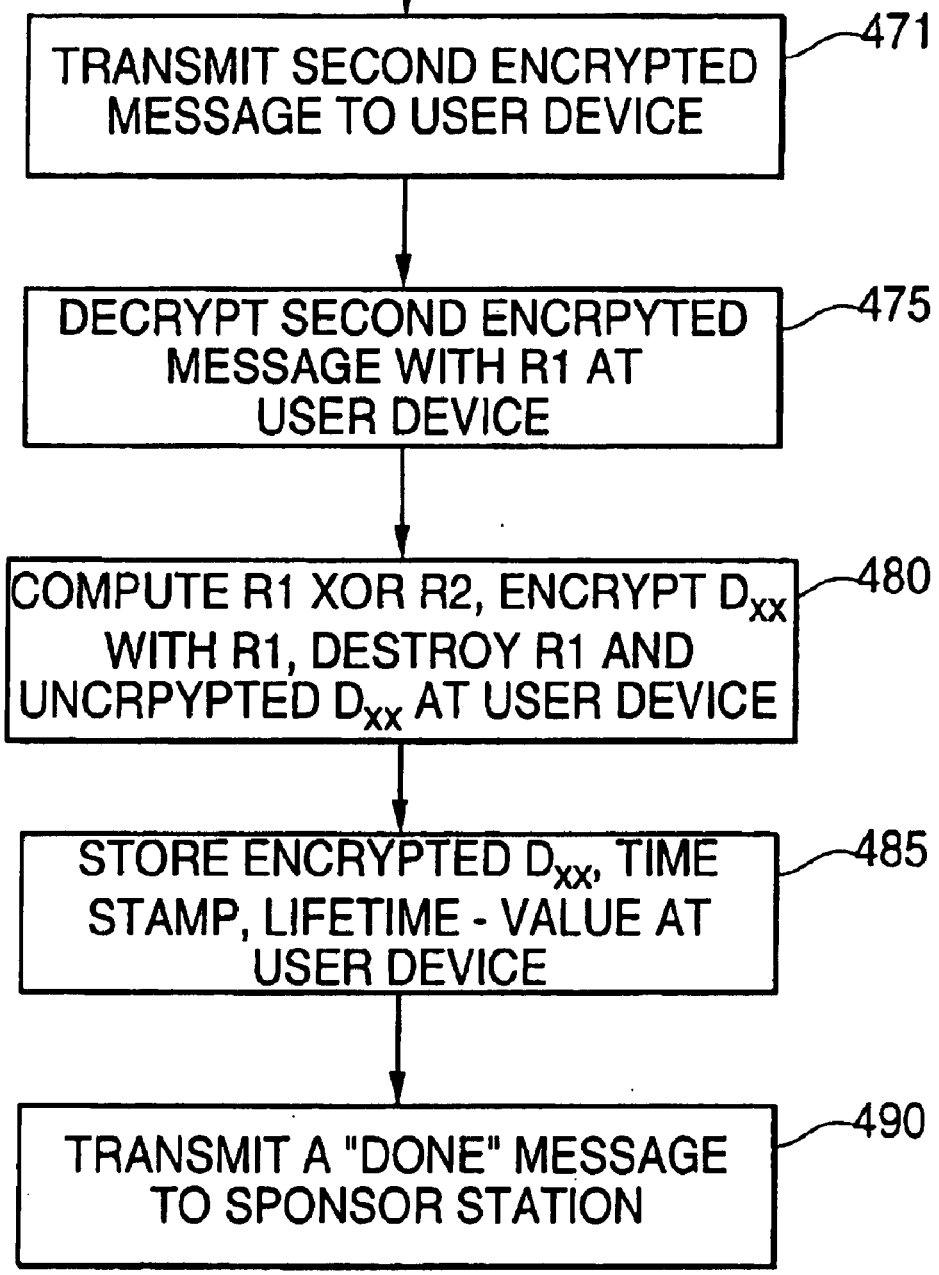

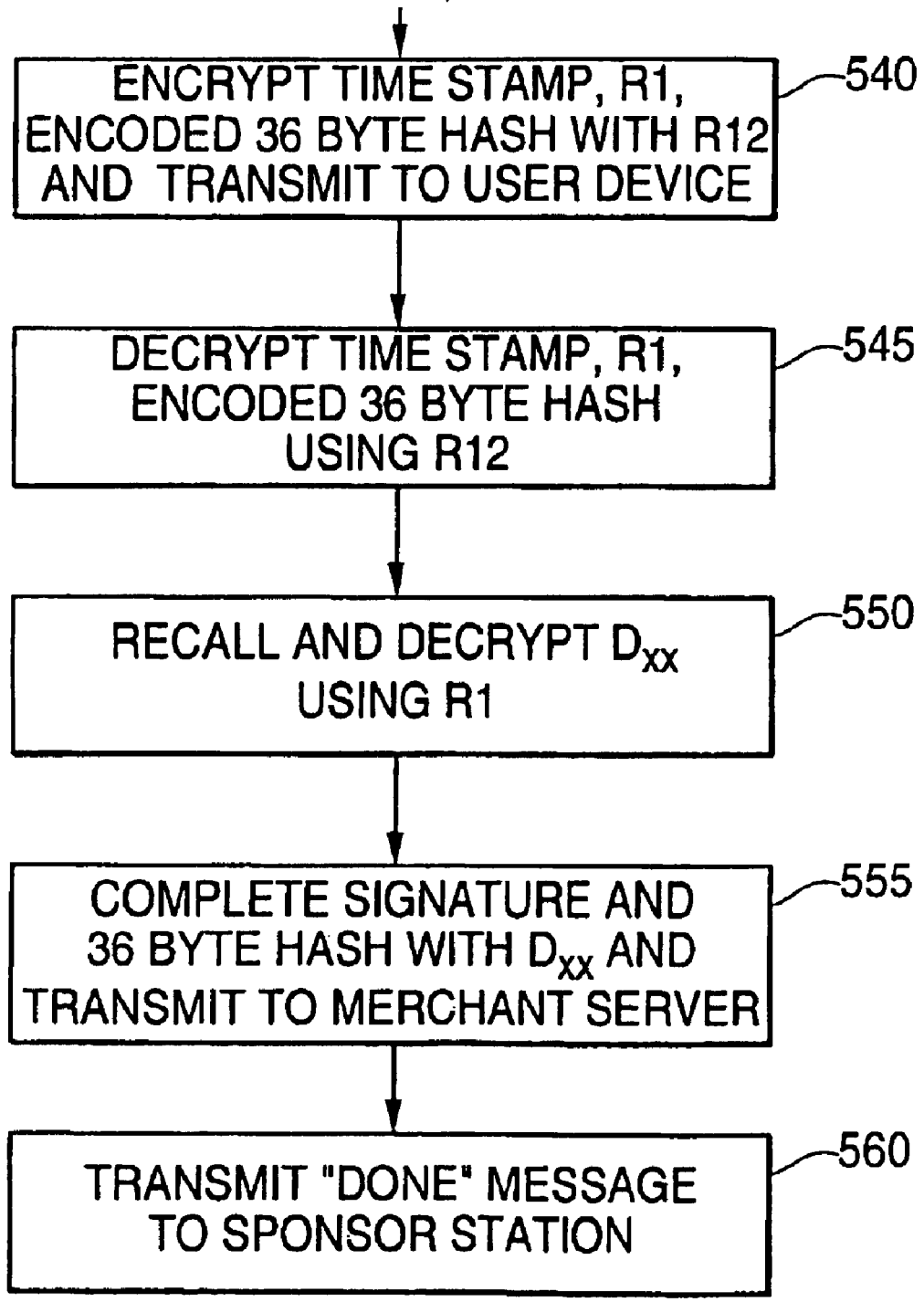

FIG. 8

| USER ID | PASSWORD | TIME/DATE | SIZE | MET |
|---------|----------|-----------|------|-----|
| JohnA | Rover | 12:23A.M./02/33/1999 | 128 | YES |
| BSmith | Dir8sle | 10:01P.M./08/15/2000 | 256 | NO |
| | | | | |
| | | | | |
| | | | | |
| | | | | |

1010 USER ID, 1015 PASSWORD, 1025 TIME/DATE, 1020 1030 SIZE, 1035 MET

FIG. 9

| USER ID | PASSWORD | # OF UNSUCCESSFUL ATTEMPTS |
|---------|----------|----------------------------|
| JohnA   | Rover    | 0                          |
| BSmith  | Dir8sle  | 4                          |
|         |          |                            |
|         |          |                            |
|         |          |                            |
|         |          |                            |

FIG. 11

| VALUE | TIME PERIOD |
|-------|-------------|
| 0     | 0           |
| 1     | 10 SECONDS  |
| 2     | 20 SECONDS  |
| 3     | 40 SECONDS  |
|       |             |
|       |             |

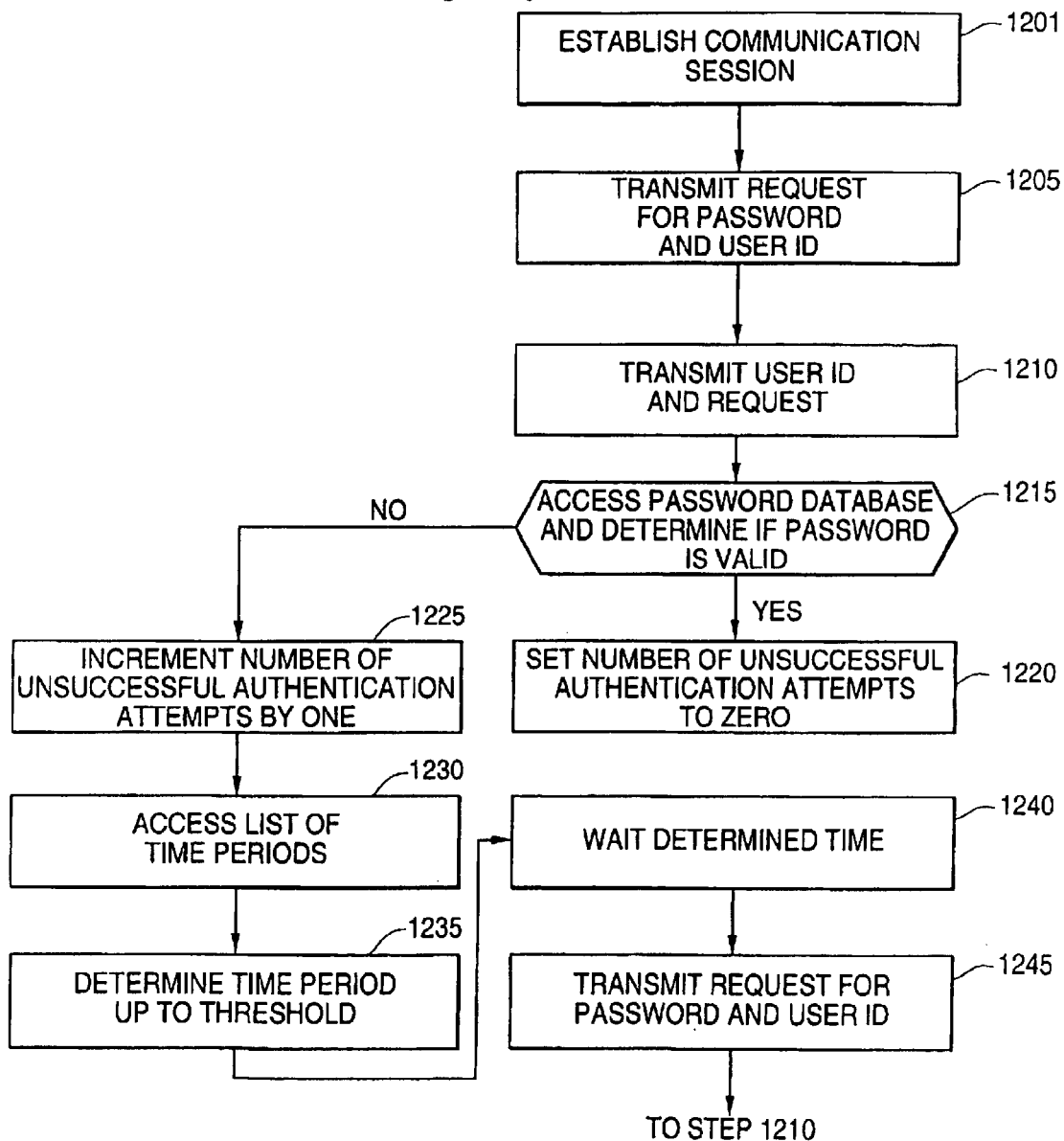

SYSTEM AND METHOD FOR PASSWORD THROTTLING

TECHNICAL FIELD

This invention relates to secure computing. More particularly, the present invention relates to user authentication.

Background Art Common

Today, computing devices are almost always interconnected via networks. As these networks can be large closed networks, as within a corporation, or truly public networks as the Internet is, the network itself might have hundreds, thousands or even millions of potential users. Consequently it is often required to restrict access to any given computer or service, or a part of a computer or service to a subset of the users on the public or closed network. For instance, a brokerage might have a public website accessible to all, but would like to only give Ms. Alice Smith access to Ms. Alice Smith's brokerage account.

This is an old problem, tracing its roots to the earliest days of computers, and passwords were among the first techniques used, and to this day remain the most widely used technique for protecting resources on a computer or service.

In its simplest form, every user has a unique password and the computer has knowledge of the user password. When attempting to log on Alice would enter her userid, say alice, and password, say apple23, the computer would compare the pair, i.e. alice, apple23, with the pair it had stored for Alice, and if there is a match would establish a session and give Alice access.

This simple scheme suffers from two problems. First, the table containing the passwords is stored on the computer, and represents a single point of compromise. If Eve could somehow steal this table, she would be able to access every user's account. A second problem with this approach is that when Alice enters her password it travels from her terminal to the computer in the clear, and Eve could potentially eavesdrop. For instance the "terminal" could be Alice's PC at home, and the computer could be a server on the Internet, in which case her password travels in the clear on the Internet.

Various solutions have been proposed and implemented to solve these two issues. For instance, to solve the first problem of storing the password on the computer, the computer could instead store a one way function of the password. E.g. F(apple23)=XD45DTY, and the pair {alice, XD45DTY}. In this example as F( ) is a one way function, computing XD45DTY from apple23 is easy, but as it is a "one way function", the reverse is believed to be difficult or close to impossible. So when Alice logs on and sends the computer {alice, apple23}, the computer can compute F(apple23) and compare the result with XD45DTY. The UNIX operating system was among the first to implement such a system in the late 1970's.

Before discussing more sophisticated conventional techniques for solving this problem, let us briefly describe symmetric, asymmetric and 'split private key' cryptography.

In symmetric key cryptography, the two parties who want to communicate in private share a common secret key, say K. the sender encrypts messages with K, to generate a cipher, i.e. C=Encrypt (M,K). The receiver decrypts the cipher to retrieve the message, i.e. D=Decrypt(C,K). An attacker who does not know K, and sees C, cannot successfully decrypt the message, if the underlying algorithms are strong. Examples of such systems are DES and RC4. Encryption and decryption with symmetric keys provide a confidentiality, or privacy service.

Symmetric keys can also be used to provide integrity and authentication of messages in a network. Integrity and authentication means that the receiver knows who sent a message and that the message has not been modified so it is received as it was sent. Integrity and authentication is achieved by attaching a Message Authentication Code (MAC) to a message M. E.g., the sender computes S=MAC (M,K) and attaches S to the message M. When the message M reaches the destination, the receiver also computes S'=MAC(M,K) and compares S' with the transmitted value S. If S'=S the verification is successful otherwise verification fails and the message should be rejected. Early MACs were based on symmetric encryption algorithms such as DES whereas more recently MACs are constructed from message digest functions, or "hash" functions, such as MD5 and SHA-1. The current Internet standard for this purpose is known as hash-based MAC (HMAC).

By combining confidentiality with integrity and authentication, it is possible to achieve both services with symmetric key cryptography. It is generally accepted that different keys should be used for these two services and different keys should be used in different directions between the same two entities for the same service. Thus if Alice encrypts messages to Bob with a shared key K, Bob should use a different shared key K' to encrypt messages from Bob to Alice. Likewise Alice should use yet another key K" for MACs from Alice to Bob and Bob should use K'" for MACs from Bob to Alice. Since this is well understood by those skilled in the art, we will follow the usual custom of talking about a single shared symmetric key between Alice and Bob, with the understanding that strong security requires the use of four different keys.

Symmetric key systems have been in use for literally thousands of years, and have always suffered from a major problem—namely how to perform key distribution. How do Bob and Alice agree on K? Asymmetric key cryptography was invented to solve this problem. Here every user is associated with two keys, which are related by special mathematical properties. These properties result in the following functionality: a message encrypted with one of the two keys can then only be decrypted with the other.

One of these keys for each user is made public and the other is kept private. Let us denote the former by E, and the latter by D. So Alice knows Dalice, and everyone knows Ealice. To send Alice the symmetric key K, Bob simply sends C=Encrypt(K,Ealice). Alice, and only Alice (since no one else knows Dalice), can decrypt the ciphertext C to recover the message, i.e. Decrypt(C,Dalice)=K. Now both Alice and Bob know K and can use it for encrypting subsequent messages using a symmetric key system. Why not simply encrypt the message itself with the asymmetric system? This is simply because in practice all known asymmetric systems are fairly inefficient, and while they are perfectly useful for encrypting short strings such as K, they are inefficient for large messages.

The above illustrates how asymmetric cryptography can solve the key distribution problem. Asymmetric cryptography can also be used to solve another important problem, that of digital signatures. To sign a message M, Alice encrypts it with her own private key to create S=Encrypt (M,Dalice). She can then send (M,S) to the recipient who can then decrypt S with Alice's public key to generate M', i.e. M'=Decyrpt(S,Ealice). If M'=M then the recipient has a valid signature as only someone who has Dalice, by definition only Alice, can generate S, which can be decrypted with Ealice to produce M. To convey the meaning of these cryptographic operations more clearly they are often written as S=Sign(M,Dalice) and M'=Verify(M,S,Ealice). It is worth noting that asymmetric key digital signatures provide non-repudiation in addition to the integrity and authentication achieved by symmetric key MACs. With MACs the verifier can compute the MAC for any message M of his choice since the computation is based on a shared secret key. With digital signatures this is not possible since only the sender has knowledge of the sender's private key required to compute the signature. The verifier can only verify the signature but not generate it.

The RSA cryptosystem is one system that implements asymmetric cryptography as described above. In particular the RSA cryptosystem allows the same public-private key pair to be used for encryption and for digital signatures. It should be noted there are other asymmetric cryptosystems which implement encryption only e.g., ElGamal or digital signature only, e.g., DSA.

Finally, the above description does not answer the important question of how Bob gets Alice's public key Ealice. The process for getting and storing the binding [Alice, Ealice] which binds Ealice to Alice is tricky. The most practical method appears to be to have the binding signed by a common trusted authority. So such a "certificate authority" (CA) can create CERTalice=Sign([Alice, Ealice], Dca). Now CERTalice can be verified by anyone who knows the CA's public key Eca. So in essence, instead of everyone having to know everyone else's public key, everyone only need know a single public key, that of the CA. More elaborate schemes with multiple Certificate Authorities, sometimes having a hierarchical relationship, have also been proposed.

Asymmetric key cryptosystems have been around for a long time, but have found limited use. The primary reasons are twofold: (a) the private key D in most systems is long, which means that users cannot remember them, and they have to either be stored on every computer they use, or carried around on smart cards or other tokens; and (b) the infrastructure for ensuring a certificate is valid, which is critical, is cumbersome to build, operate and use. The first technique proposed to validate certificates was to send every recipient a list of all certificates that had been revoked. This clearly does not scale well to an environment with millions of users. The second method proposed was to require that one inquire about the validity of a certificate on-line, which has its own associated problems.

A system based on split private key cryptography has been developed to solve these two issues, among others. In this system the private key for Alice, i.e. Dalice, is further split into two parts, Daa which Alice knows, and a part Das which is stored at a security server. To sign a message, Alice could perform a partial encryption to generate a partial signature, i.e. PS=Sign(M,Das). Alice then sends the server PS which 'completes' the signature by performing S=Sign (PS,Dss). This completed signature S is indistinguishable from one generated by the original private key, so the rest of the process works as previously described. However, Daa can be made short, which allows the user to remember it as a password, so this system is consumer friendly. Further, if the server is informed that a particular ID has been revoked, then it will cease to perform its part of the operation for that user, and consequently no further signatures can ever be performed. This provides for instant revocation in a simple highly effective fashion.

Let us return now to password based systems. Challenge-response systems solve the issue of having to send passwords in the clear across a network. If the computer and Alice share a secret password, P, then the computer can send her a new random challenge, R, at the time of login. Alice computes C=Encrypt(R,P) and sends back C. The computer decrypts Decrypt(C,P)=C'. If C=C', then the computer can trust that it is Alice at the other end. Note however that the computer had to store P. A more elegant solution can be created using asymmetric cryptography. Now Alice has a private key Dalice, or in a split private key system she has Daa. The computer challenges her to sign a new random challenge R. She signs the challenge, or in the split private key system she interacts with the security server to create the signature, and sends it back to the computer which uses her public key, retrieved from a certificate, to verify the signature. Observe that the computer does not have to know her private key, and that an eavesdropper observing the signature on R gains no knowledge of her private key.

The SSL system, which is widely used on the Internet in effect implements a more elaborate method of exactly this protocol. SSL has two components, 'server side SSL' in which a server proves its identity by signing a particular message during connection set-up. As browsers such as Netscape and Microsoft Internet Explorer come loaded with the public keys of various CAs, the browser can verify the signature of the server. This authenticates the server to the client, and also allows for the set-up of a session key K, which is used to encrypt all further communications. Server side SSL is widely used, as the complexity of managing certificates rests with system administrators of web sites who have the technical knowledge to perform this function. The converse function in SSL, client side SSL, which lets a client authenticate herself to a server is rarely used, because although the technical mechanism is exactly the same, it now requires users to manage certificates and long private keys which has proven to be difficult, unless they use the split private key system. So in practice, most Internet web sites use server side SSL to authenticate themselves to the client, and to obtain a secure channel, and from then on use Userid, Password pairs to authenticate the client.

So far from disappearing, the use of passwords has increased dramatically. Passwords themselves are often dubbed as inherently "weak" which is inaccurate, because if they are used carefully passwords can actually achieve "strong" security. As discussed earlier passwords should not be sent over networks, and if possible should not be stored on the receiving computer. Instead, in a "strong" system, the user can be asked to prove knowledge of the password without actually revealing the password. And perhaps most critically passwords should not be vulnerable to dictionary attacks.

Dictionary attacks can be classified into three types. In all three cases the starting point is a 'dictionary' of likely passwords. Unless the system incorporates checks to prevent it, users tend to pick poor passwords, and compilations of lists of widely used poor passwords are widely available.

1) On line dictionary attack. Here the attacker types in a guess at the password from the dictionary. If the attacker is granted access to the computer they know the guess was correct. These attacks are normally prevented by locking the user account if there are an excessive number of wrong tries. Note that this very commonly used defense prevented one problem, but just created another one. An attacker can systematically go through and lock out the accounts of hundreds or thousands users. Although the attacker did not gain access, now legitimate users cannot access their own accounts either, creating a denial of service problem.

2) Encrypt dictionary attacks: If somewhere in the operation of the system a ciphertext C=Encrypt(M,P) was created, and the attacker has access to both C and M, then the attacker can compute off-line C1=Encrypt(M,G1), C2=Encrypt(M,G2), . . . where G1, G2, . . . etc. are the guesses at the password P from the dictionary. The attacker stops when he finds a Cn=C, and knows that Gn=P. Observe that the UNIX file system, which uses a one way function F( ) instead of an encryption function E( ), is vulnerable to this attack.

3) Decrypt dictionary attacks: Here the attacker, does not know M, and only sees the ciphertext C (where C=Encrypt (M, P). The system is only vulnerable to this attack IF it is true that M has some predictable structure. So the attacker tries M1=Decrypt(C,G1), M2=Decrypt(C, G2) . . . , and stops when the Mi has the structure he is looking for. For instance Mi could be known to be a timestamp, English text, or a number with special properties such as a prime, or a composite number with no small factors.

It is possible to design strong password based systems but the password should not be stored on the computer in any form, ever communicated to it, and should be protected from all three types of dictionary attacks.

The split private key system is a password based system which meets almost all the requirements for being a secure password system. The secure server knows only its portion Das of the private key, and the user knows Daa. The server challenges the user to sign a random challenge and when a user does so successfully the user has revealed knowledge of Daa without revealing Daa. Further, Daa itself is never transmitted over a network. In a carefully constructed protocol based on the split private key system it is possible to prevent both encrypt and decrypt dictionary attacks.

However, previously proposed split private key systems do not protect against on-line dictionary attacks. This is because, as described earlier, the existing techniques of preventing on-line password guessing attacks have the unfortunate side effect of locking out the legitimate users, and can be used to mount a 'denial of service' attack, wherein the attacker does not succeed in breaking into the system but succeeds in locking out legitimate users.

OBJECTIVES OF THE INVENTION

It is an object of the present invention to provide a technique for defending against multiple forms of on-line guessing attacks, while reducing, or altogether eliminating, the possibility that an authorized user is not prevented from obtaining authentication.

Additional objects, advantages, novel features of the present invention will become apparent to those skilled in the art from this disclosure, including the following detailed description, as well as by practice of the invention. While the invention is described below with reference to preferred embodiment(s), it should be understood that the invention is not limited thereto. Those of ordinary skill in the art having access to the teachings herein will recognize additional implementations, modifications, and embodiments, as well as other fields of use, which are within the scope of the invention as disclosed and claimed herein and with respect to which the invention could be of significant utility.

SUMMARY DISCLOSURE OF THE INVENTION

According to the invention, a request for access to, for example, a network site, services available at a network site, or data residing at a network site or individual station, is received from a user claiming to be a particular user. A first challenge having a first level of complexity, which could for example be based on the bit length of the challenge, is transmitted to the user. A response to the transmitted first challenge is transmitted by the user. A determination is made as to whether or not the transmitted response authenticates the user as the particular user. If so, the requested access is allowed to the user. However, if the transmitted response does not authenticate the user, a second challenge having a second level of complexity, which is greater than that of the first challenge, is transmitted to the user. After each subsequent response to a challenge which does not authenticate the user, a further challenge with a still greater level of complexity, i.e. greater than the level of complexity of the immediately proceeding transmitted challenge, is preferably transmitted to the user.

Preferably, this process of increasing the complexity of the challenge only continues until a pre-set maximum_complexity threshold is reached. If it was to continue indefinitely, there is a possibility that the legitimate user will also in effect be locked out. Therefore increasing complexity is not sufficient, the increase must stop at a carefully chosen maximum_complexity threshold if an authorized user is to be ensured that he/she will not be locked out. Beneficially, this maximum_complexity threshold is chosen such that a legitimate user entering the correct password will experience a delay in gaining access, but this delay is as large as is considered to be tolerable to the user. For instance, if a user is normally granted access in two seconds but has to wait thirty seconds, the delay may be deemed tolerable, but asking the user to wait five minutes would likely be considered intolerable. The maximum_complexity threshold should advantageously be sufficiently large to be a significant impediment to the attacker. The attacker, unlike the legitimate user, does not know the correct password and has to try perhaps tens of millions of guesses G1, G2 . . . By increasing the complexity of the challenge, a delay of a factor of even 10 per calculation, causes the effectiveness of the attack to drop tenfold.

It will be recognized that this innovation can be used not just with split private key cryptosystems, but with any challenge response based authentication system.

Advantageously, the response to the transmitted first challenge includes the transmitted first challenge transformed with a first crypto-key. By further transforming the transformed first challenge with a second crypto-key, it can be determined if the transmitted response authenticates the user as the particular user. More particularly, if the transmitted first challenge is recovered by further transforming the transformed first challenge, the user is authenticated. Preferably, the first and the second crypto-keys are associated asymmetric crypto-keys.

According to other aspects of the invention, which may be used separately from or combined with the previously described increase in complexity of the challenges, the first challenge to the user is transmitted after the passage of a first time period following receipt of the request. If a second challenge is required due to non-authentication of the user by the response to the first challenge, the second challenge to the user is transmitted after the passage of a second time period, which is longer than the first time period, following receipt of the response. Here again, following each subsequently received response to a challenge which does not authenticate the user, a further challenge is preferably transmitted to the user after a still longer time period, i.e. a time period longer than the time period between receipt of an earlier response and transmission of the immediately proceeding challenge. A maximum time threshold similar to the maximum complexity threshold described above could also be utilized.

In a hardware embodiment, a system for authenticating a user, includes a communications port for receiving communications from and for transmitting communications to a user, and a processor. The processor generates the first challenge responsive to a first communication requesting access from the user which is received via the communications port. The processor also directs transmission of the generated first challenge to the user via the communications port. If, based on a second communication from the user responding to the generated first challenge which the processor receives via the communications port, the processor is able to authenticate the user as the particular user, the processor allows the requested access to the user responsive to the second communication. However, if the processor cannot authenticate the user based on the second communication, the processor generates a second challenge responsive to the second communication and directs transmission of the generated second challenge to the user via the communications port.

In a networked system implementation, a first network processor, which could form part of virtually any type of network device, transmits the request for access from the user claiming to be a particular user. A second network processor transmits the first challenge to the first network processor responsive to the transmitted request. The first network processor transmits a response to the transmitted first challenge. The second network processor either allows the requested access to the user, if the transmitted response authenticates the user as the particular user, or transmits a second challenge, if the transmitted response does not authenticate the user.

BRIEF DESCRIPTION OF DRAWINGS

FIGS. 2a–2c is a flow chart showing the operations which are performed by a user and the sponsor station of the present invention for the user to log on with the sponsor station FIGS. 3a–3b is a flow chart showing the operations which are performed by a user and the sponsor station of the present invention for a user to authenticate himself or herself to a server.

FIG. 8 is a simplified depiction of a password database in accordance with the present invention.

FIG. 9 is a simplified depiction of an alternative password database in accordance with the present invention.

FIG. 10 is a flow chart showing the operations which are performed by a user and a merchant server of the present invention for the user to authenticate himself to the merchant server.

FIG. 11 is a simplified depiction of a list of time periods which correspond to a number of unsuccessful authentication attempts.

BEST MODE FOR CARRYING OUT THE INVENTION

First Embodiment

Figure 1:
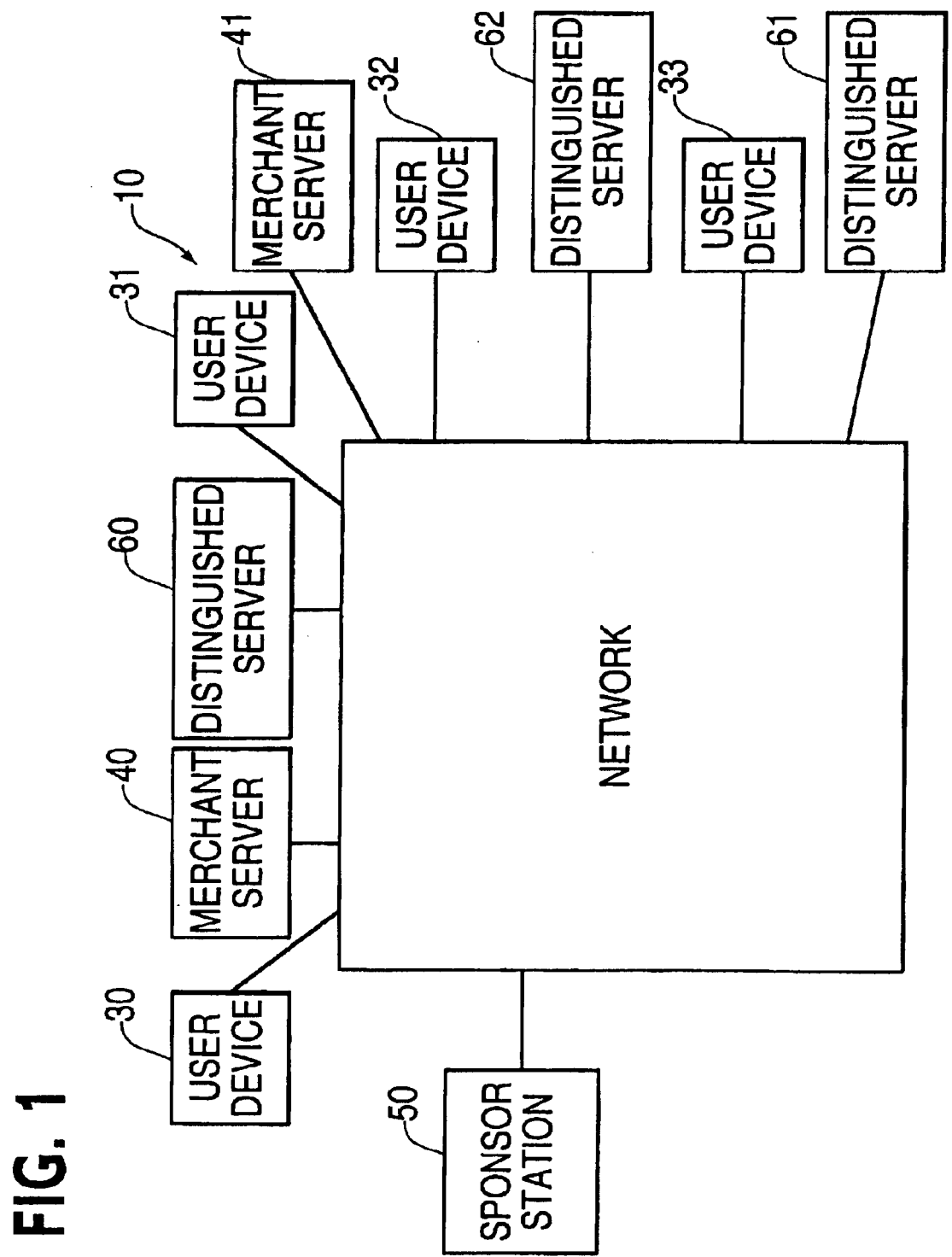
FIG. 1 depicts an exemplary network of the present invention, including networked devices of the present invention.

FIG. 1 illustrates a network 10, which could be the Internet. As shown, the network 10 is an interconnection of networked devices in communication with each other. These networked devices include networked devices 30–33 associated with individual network users, networked device 40–41 associated with a merchant network user, a sponsor station 50 associated with a sponsor, and networked devices 60–62 associated with entities known to and trusted by the sponsor.

Networked devices 30–33 will be referred to as user devices. These network devices are typically personal computers. Networked devices 40–41 will be referred to as merchant servers. Networked devices 60–62 will be referred to as distinguished servers. It will be understood that a network may consist of more networked devices than depicted in FIG. 3!

Figure 4:
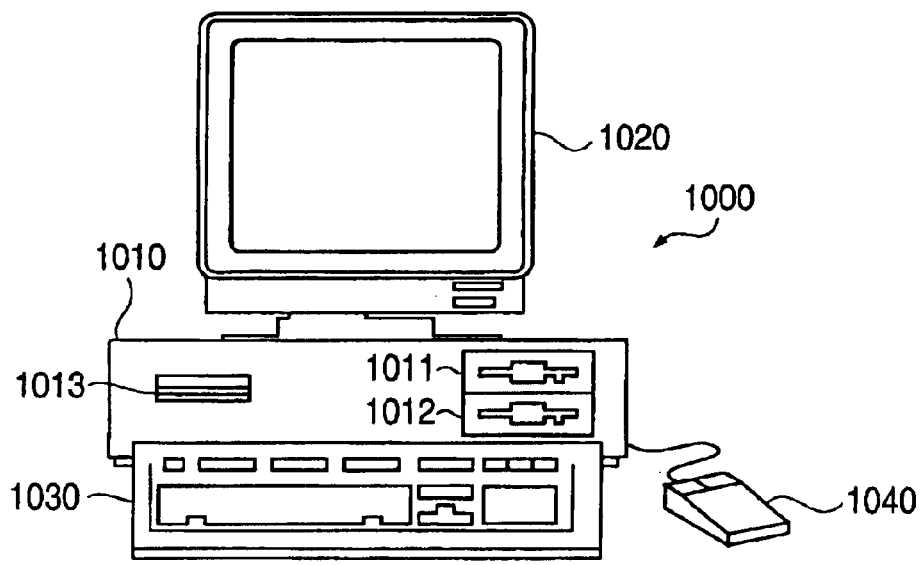
FIG. 4 depicts a computer suitable for use by a user to access a network in accordance with the invention.
Figure 5:
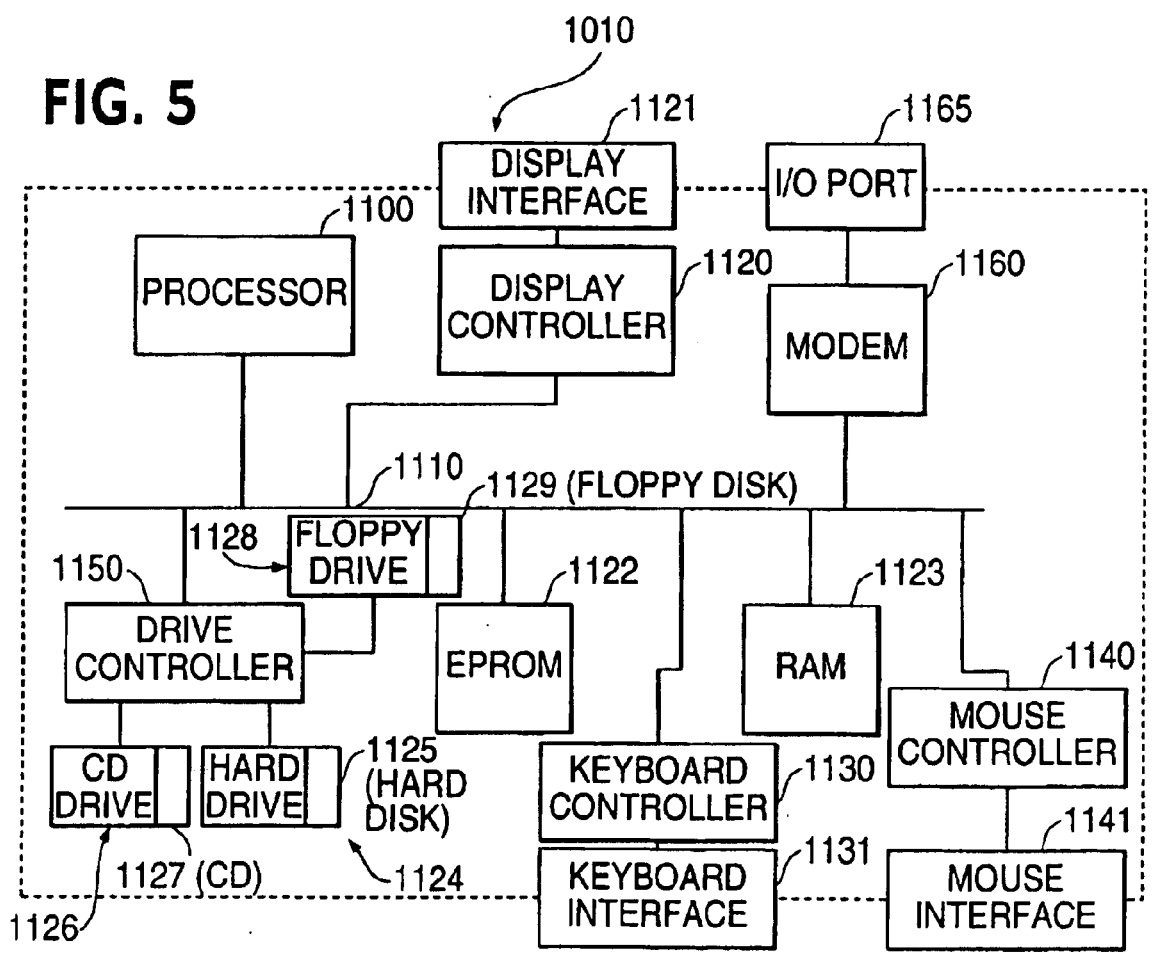
FIG. 5 is an exemplary block diagram of components of the computer depicted in FIG. 6.

FIGS. 4 and 5 depict an exemplary personal computer suitable for use by individual users to access the network 10 in the below-described invention. The computer is preferably a commercially available personal computer. It will be recognized that the computer configuration is exemplary in that other components (not shown) could be added or substituted for those depicted and certain of the depicted components could be eliminated if desired.

The computer functions in accordance with stored programming instructions which drive its operation. Preferably, the computer stores its unique programming instructions on an EPROM, or hard disk. It will be recognized that only routine programming is required to implement the instructions required to drive the computer to operate in accordance with the invention, as described below. Further, since the computer components and configuration are conventional, routine operations performed by depicted components will generally not be described, such operations being well understood in the art.

Referring to FIG. 4, the computer 1000 includes a main unit 1010 with slots 1011, 1012, and 1013, respectively provided for loading programming or data from a floppy disk and/or compact disk (CD) onto the computer 1000. The computer 1000 also includes a keyboard 1030 and mouse 1040 which serve as user input devices. A display monitor 1020 is also provided to visually communicate information to the user.

As depicted in FIG. 5, the computer 1000 has a main processor 1100 which is interconnected via bus 1110 with various storage devices including EPROM 1122, RAM 1123, hard drive 1124, which has an associated hard disk 1125, CD drive 1126, which has an associated CD 1127, and floppy drive 1128, which has an associated floppy disk 1129. The memories, disks and CD all serve as storage media on which computer programming or data can be stored for access by the processor 1100. The memory associated with a personal computer here after will collectively be referred to as Memory 1170. A drive controller 1150 controls the hard drive 1124, CD drive 1126 and floppy drive 1128. Also depicted in FIG. 5 is a display controller 1120 interconnected to display interface 1121, a keyboard controller 1130 interconnected to keyboard interface 1131, a mouse controller 1140 interconnected to mouse interface 1141 and a modem 1160 interconnected to I/O port 1165, all of which are connected to the bus 1110. The modem 1160 and interconnected I/O port 1165 are used to transmit and receive signals via the Internet 100 as described below. It will be understood that other components may be connected if desired to the bus 1110. By accessing the stored computer programming, the processor 1100 is driven to operate in accordance with the present invention.

Sponsor station 50, the merchant users and the distinguished entities are preferably represented on network 10 by an Internet server of the applicable type shown in FIGS. 6 and 7, as will be described further below. However, here again, any network compatible device which is capable of functioning in the described manner could be substituted for the servers shown in FIGS. 6 and 7.

Figure 6:
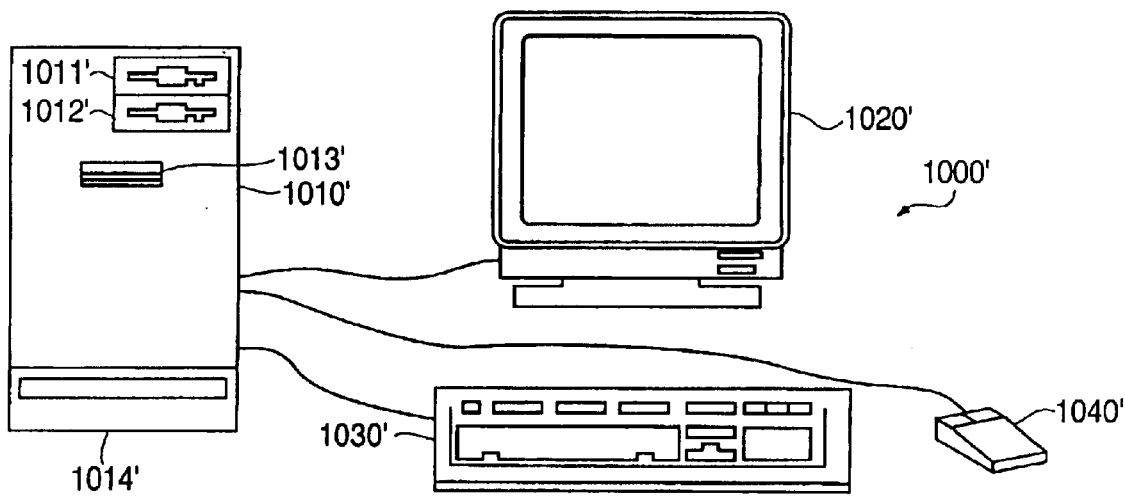
FIG. 6 depicts a server suitable for use by the sponsor station, distinguished entities, and merchants in accordance with the present invention.
Figure 7:
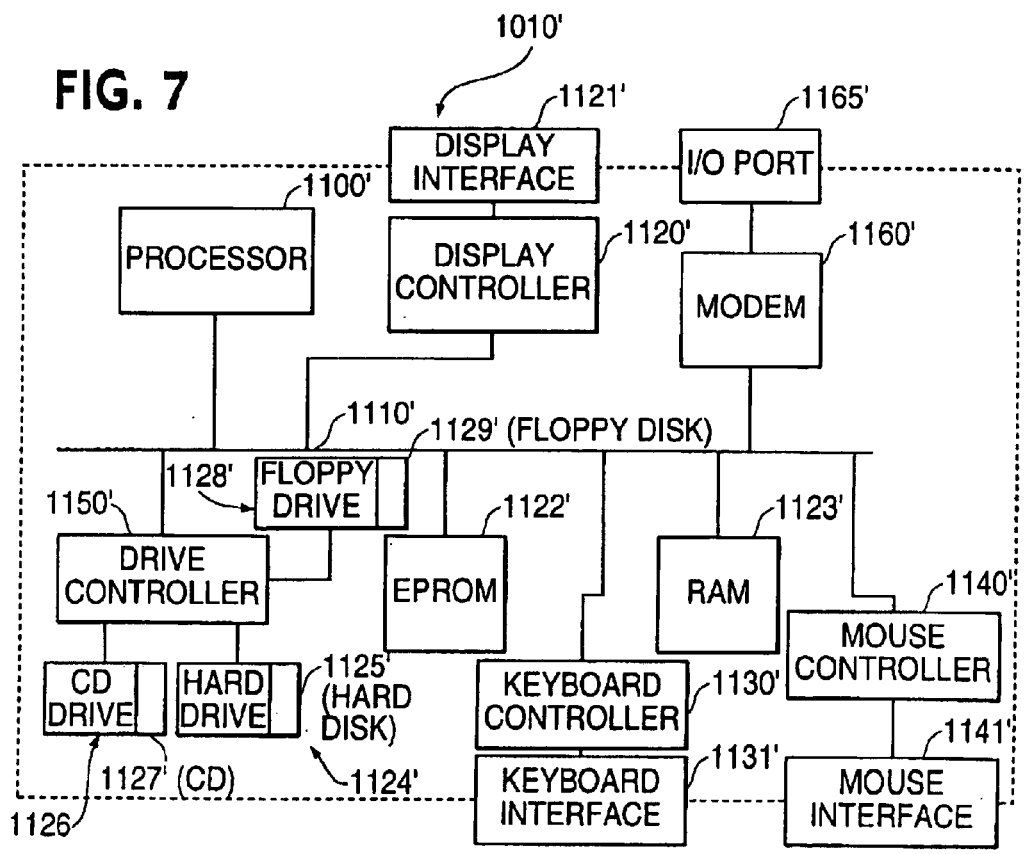
FIG. 7 is an exemplary block diagram of components of the server depicted in FIG. 8.

FIGS. 6 and 7 depict an exemplary network server suitable for use by the sponsor, merchants, and distinguished entities to access the network 10 in the below-described invention. The server is preferably a commercially available high power, mini-computer or mainframe computer. Here again, it will be recognized that the server configuration is exemplary in that other components (not shown) could be added or substituted for those depicted and certain of the depicted components could be eliminated if desired.

The server functions as described below in accordance with stored programming instructions which drive its operation. Preferably, the server stores its unique programming instructions on an EPROM or hard disk. It will be recognized that only routine programming is required to implement the instructions required to drive the server to operate in accordance with the invention, as described below. Further, since the server components and configuration are conventional, routine operations performed by depicted components will generally not be described, such operations being well understood in the art.

Referring to FIG. 6, the server 1000' includes a main unit 1010' with slots 1011', 1012', 1013' and 1014', respectively provided for loading programming or data from a floppy disk, CD and/or hard disk onto the server 1000'. The server 1000' also includes a keyboard 1030' and mouse 1040', which serve as user input devices. A display monitor 1020' is also provided to visually communicate information to the user.

As depicted in FIG. 7, the server 1000' has a main processor 1100' which is interconnected via bus 1110' with various storage devices including EPROM 1122', RAM 1123', hard drive 1124', which has an associated hard disk 1125', CD drive 1126', which has an associated CD 1127', and floppy drive 1128', which has an associated floppy disk 1129'. The memories, disks and CD all serve as storage media on which computer programming or data can be stored for access by the processor 1100'. The stored data includes one or more databases containing information associated with network users. The memories associated with a server hereafter will be collectively referred to as memory 1170'. A drive controller 1150' controls the hard drive 1124', CD drive 1126' and floppy drive 1128'. Also depicted in FIG. 7 is a display controller 1120' interconnected to display interface 1121', a keyboard controller 1130' interconnected to keyboard interface 1130', a mouse controller 1140' interconnected to mouse interface 1141' and a modem 1160' interconnected to I/O port 1165', all of which are connected to the bus 1110'. The modem 1160' and interconnected I/O port 1165' are used to transmit and receive signals via the network 10 as described above. It will be understood that other components may be connected if desired to the bus 1110'. By accessing the stored computer programming, the processor 1100' is driven to operate in accordance with the present invention.

An asymmetric crypto-key is associated with at least individual network users 30–32 and each distinguished server. If desired, an asymmetric crypto-key can also be associated with each merchant user. Each asymmetric crypto-key is consists of two portions, a public portion and a private portion. The public portion of each asymmetric crypto-key is known to at least each merchant user. If desired, the public portion of each asymmetric crypto-key can also be known to each individual user. Each of these public portions can be stored on each merchant server, or on each merchant server and each individual device. The private portion of each asymmetric crypto-key consists of at least a first private portion and a second private portion. The first private portion is retained by the individual or merchant user with whom the asymmetric crypto-key is associated. The first private portion of the asymmetric crypto-key will be referred to as Dxx and serves as a user password, as will be discussed below. The second private portion of each asymmetric crypto-key is retained by the sponsor station 50 and will be referred to as Dxs.

The asymmetric crypto-keys are used in transforming information. Preferably, the asymmetric crypto-keys are used in providing trusted authentication of network users. This authentication includes authentication of an individual user to a merchant user, to the sponsor station 50, and to other individual users. Also, the asymmetric crypto-keys can be used in providing trusted authentication between merchant users and the sponsor station 50 and distinguished servers.

In the case of providing trusted authentication of an individual user, in this instance, the individual user associated with user device 30, to a merchant user, in this instance, the merchant user associated with merchant server 40, the following operations, as shown in FIGS. 2 and 3, are performed by networked devices 30 and 40.

A communication session between user device 30 and merchant server 40 via network 10 is established, step 401 of FIG. 2. Merchant server 40 transmits a request via network 10 to user device 30 requesting that the individual user authenticate himself or herself to the merchant user, step 410. As described above, this request typically is a request for the party being authenticated to sign a 36 bit hash provided by the authenticating party.

In response to this request, the user device 30 determines if a logged-in ticket is stored on memory 1170 at the user device 30, step 415. If so, operations continue as described below and shown at step 510 of FIG. 3*a*. If not, user device 30 requests the individual user to enter his or her user ID and password into the user device 30 to begin a log on protocol, step 420.

Alternatively, a user associated with an asymmetric crypto-key may contact the sponsor station 50, via the network 10, to log on prior to establishing a communications session with another network station. In this instance, processing begins with establishing a communications session between the user device and the sponsor station 50, step 405. Processing in this instance continues with step 420 as herein described.

User device 30 processes the entered password to obtain Dxx, the first private portion of the asymmetric crypto-key, step 425. Processing of the entered password to obtain Dxx is discussed below. User device 30 then transmits a log-in request to sponsor station 50, step 430. The log-in request includes at least the user's user ID. It should be understood that step 425 can occur previous to step 430, concurrent with step 430, or subsequent to step 430, though it is shown previous to step 430 in FIG. 2*a*.

Sponsor station 50 receives log-in request, step 435. The sponsor station then accesses a password database. FIG. 8 is a simplified depiction of such a database 1001. This database includes user ID's 1010 and corresponding passwords 1015. Along with this information is an indication of the date 1020 and time 1025 at which unsuccessful log-in attempts have been made by an associated user. The database also includes an indication of the size of a most recent challenge presented to a user 1030 and if that challenge was correctly met 1035, all to be explained below. From this database the sponsor station determines if the most recent challenge was correctly met, step 436. If so, operations continue as depicted in step 437.

The sponsor station generates a challenge C to the user device 30, step 437. This challenge is preferably a 128 bit length alpha-numeric string. The challenge C is transmitted to the user device 30, step 440. The log-in request and challenge are preferably each transmitted in the clear. That is, neither of these messages are protected. However, as will be discussed below, optional operations can be performed to protect these messages.

The user device 30 receives the challenge and generates a random number R1 and a time stamp, step 445. Preferably, R1 is a 192 bit number. Next, the user device 30 signs the challenge, time stamp and R1 with Dxx, forming a first transformed message, step 450. User device 30 transmits the first transformed message to sponsor station 50, step 451.

Sponsor station 50 further transforms the first transformed message using the second portion of the user's private key to recover the challenge, time stamp and R1, step 455. This operation authenticates the user device 30 to the sponsor station 50. If this authentication fails, that is, the challenge, time stamp and R1 are not transformed with Dxx and therefore are unrecoverable using the second portion of the user's private key, sponsor station 50 transmits a notice to the user device 30 causing the user device 30 to prompt the user to reenter his or her password, and user ID, step 460, and operations continue with step 420 as described above.

If the sponsor station 50 determines that the most recent challenge was not met, the sponsor station determines the size of the last challenge presented to the user device 30, step 438. The sponsor station 50 then generates another challenge C whose size is larger than the size of the first challenge C, step 439. The increase in challenge size can be termed 'password throttling'. This larger challenge C is then transmitted to the user device 30, as described above and depicted in step 440. Operations then continue as described above and depicted in step 445. As will be discussed further below, the operations of determining if challenges have been successfully met and if not, increasing the challenge size, preferably should continue until the maximum_challenge size is reached.

When authentication is successful, the sponsor station 50 stores an indication of a successful authentication in the database 1001, generates a second random number R2, computes the function XOR of R1 and R2, generates a time stamp, and determine a lifetime-value, step 465. As with R1, R2 is preferably a 192 bit number. The lifetime-value is the life span of the logged-in ticket. This value may be a finite time period, such as 1 hour or any other finite time period so desired, or this value may be an end time such that the logged-in ticket expires upon that time being reached. Next, the sponsor station 50 transforms R2, the time stamp, and the lifetime-value with R1, forming a second transformed message, step 470. The sponsor station 50 transmits this second transformed message to the user device 30, step 471.

The user device 30 further transforms the second transformed message using R1, recovering R2, the time stamp, and the lifetime-value, step 475. This operation authenticates the sponsor station 50 to the user device 30. The user device 30 computes function XOR of R1 and R2, encrypts Dxx with R1, and then destroys R1 and the unencrypted Dxx, step 480. The user device 30 then stores the encrypted Dxx, user ID, time stamp, and the lifetime-value on memory 1170, forming the logged-in ticket, step 485. The user device 30 then transmits a message to the sponsor station 50 which includes a 'done' indication and a time stamp which are encrypted using R12, step 490. The sponsor station 50 stores an indication in memory 1170' that the user is logged in. The user has now successfully logged in and can use the services of the sponsor station 50 to sign the 36 byte hash. As will be described below, if the user has an unexpired logged-in ticket, the user need not provide the user's client ID or password again to provide authentication to another network station requesting authentication.

Once the user is successfully logged in, to complete the authentication of user to the merchant, the user device 30 transmits an authorization request to the sponsor station 50, step 510 of FIGS. *a*–3*b*. The authorization request includes the user's user ID which is stored as part of the logged-in ticket on memory 1170. The user device 30 retrieves the user ID from memory 1170, the user device 30 does not prompt the user to enter the user ID. This transmission is sent using a Message Authentication Protocol (MAC). As will be understood by one skilled in the art, a MACed message is not encrypted, rather it includes a number string appended to the message which authenticates the sender of the message to the receiver of the message. The user device 30 MACs the authorization request with R12. The sponsor station 50 processes the received message to authenticate the user based upon the MACed message, step 515. Then, the sponsor station 50 generates and transmits an acknowledgement message to the user device 30. This is also MACed with R12, step 516.

The user device 30 authenticates the received acknowledgment and encodes a 36 byte hash, provided by the merchant server 40, step 520. Preferably, the 36 byte hash is encoded using the PKCS1 algorithm, though other well known algorithms could be used. Next, the user device 30 encrypts the 36 byte hash and a time stamp with R12 and transmits both to the sponsor station 50, step 525.

The sponsor station 50 decrypts encoded 36 byte hash and time stamp using R12, step 530. Next, the sponsor station 50 signs the encoded 36 byte hash with Dxs, the second private portion of the asymmetric crypto-key, step 535. The sponsor station 50 generates a fresh time stamp, recalls R1 from memory 1170', and transmits the time stamp, the signed encoded 36 byte hash, and R1 to the user device 30, all encrypted with R12, step 540.

The user device 30 decrypts the time stamp, the signed encoded 36 byte hash, and R1 using R12, step 545. Then, the user device 30 recalls encrypted Dxx from the memory 1170 and decrypts Dxx using R1 obtained from the sponsor box 50, step 550. The user device 30 then uses Dxx to complete the signature of the encoded 36 byte hash and transmits the fully signed 36 byte hash to the merchant server 40, step 555. To complete the transaction, the user device 30 transmits a 'done' message to the sponsor station 50, step 560.

It will be understood by one skilled in the art that any or all of the communications depicted in FIGS. 2*a*–2*c* and 3*a*–3*b* between the user device 30 and sponsor station 50 could include a sequence number. It also will be understood that any or all of the communications depicted in FIGS. 3*a*–3*b* could be encrypted with R12, MACed with R12, or both encrypted and MACed with R12. Also, further protection of encrypted messages can be obtained by use of a Salt, which will be understood by one skilled in the art.

Figure 2A:
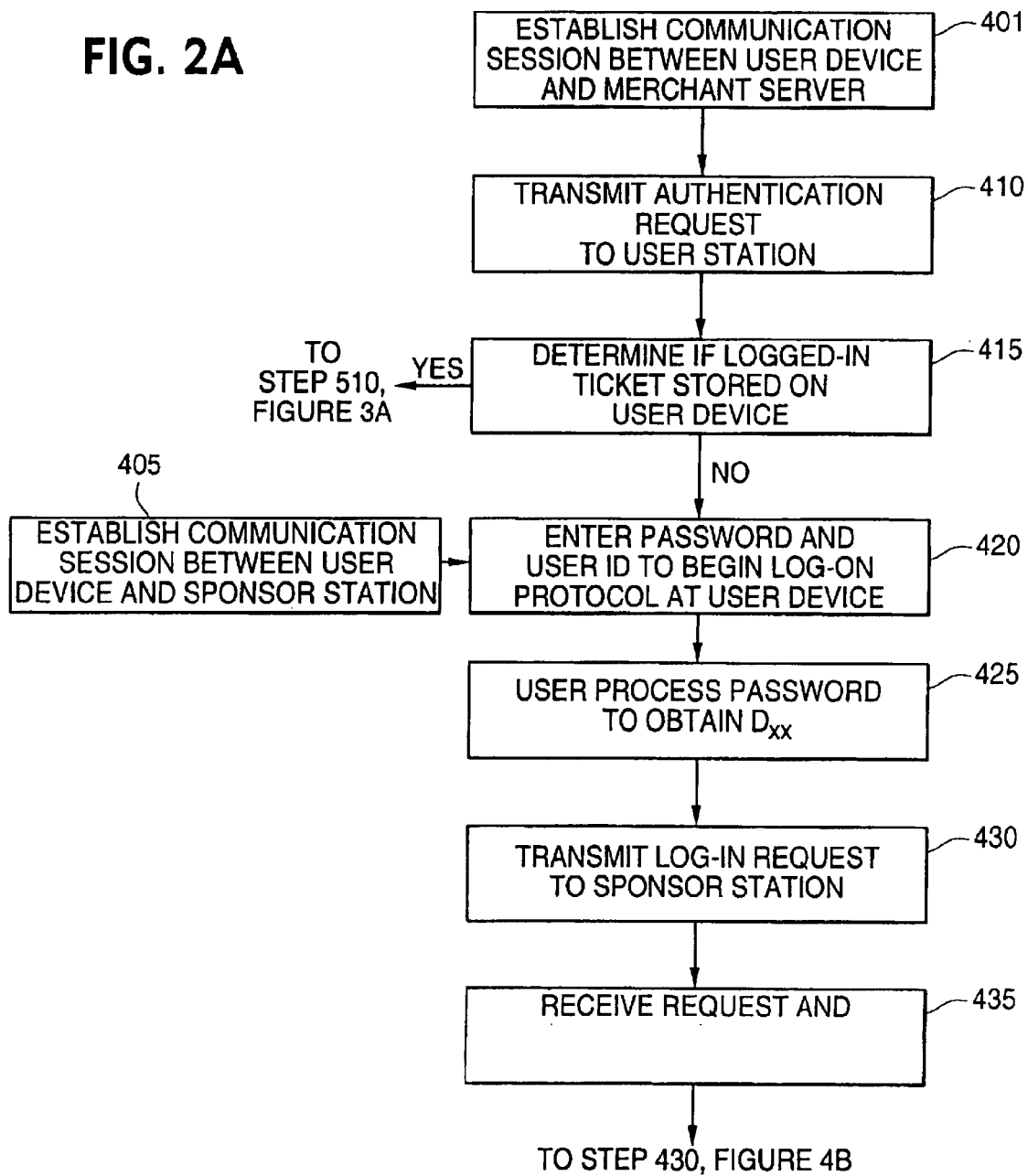
Figure 3A:
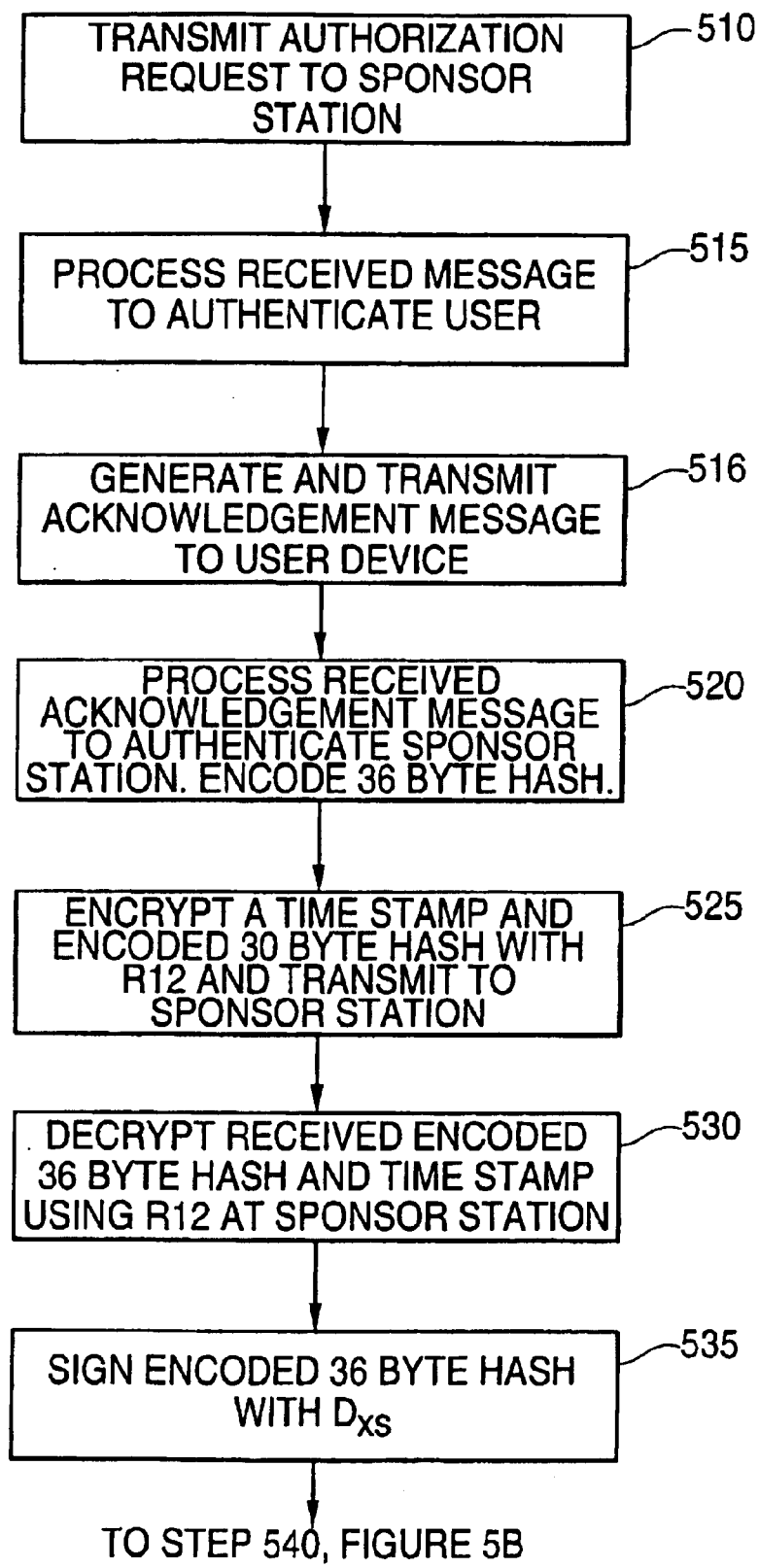

To provide trusted authentication to yet another merchant server, or perhaps to merchant server 40 at a later time, operations continue as depicted in FIG. 2a, step 401, and as discussed above. If, as depicted in step 415, the user device 30 determines that an unexpired log-in ticket is stored in memory 1170, operations continue as depicted in FIG. 3a, step 510. Thus, the user associated with network station 30 need only enter his or her user ID and password once, while the user is able to provide trusted authentication to more than one merchant user.

As introduced above, the user device 30 must transform a challenge C for authentication. The size of the challenge C and the time required to process the challenge correspond, as will be understood by one skilled in the art. A larger challenge C takes more time to compute than a smaller challenge C. This computational time can be used to foil an on-line guessing attack, and especially to foil those aided by computer programming for instituting such attacks.

The first issued challenge C is preferably 128 bits in size. The computational time to transform a challenge of this time is imperceptible to a human user. If a second challenge must be issued due to an incorrect password being submitted, the size of the challenge is increased, preferably to 256 bits in size. This increases the computational time required to transform the challenge C. This increase in challenge size can be repeated for each submission of an invalid password. But, the number of times the challenge size is increased is preferably limited such that when the challenge size reaches 64,000 bits, any additional challenges will not be increased in size. However, it should be understood that the size of this limit can be chosen as desired, that the size of the increase challenge size can be varied, or even that a threshold limit may not be used if so desired.

It will recognized by those skilled in the art that a doubling of the size of the challenge not only increases the time required to transform the challenge C, but also requires a more than doubling of the processing required to transform the challenge C. Thus, each successive transformation more than doubles in computational complexity.

This added computational time and computational complexity exponentially slows the rate at which an attacker can attempt to guess passwords. However, as will be recognized from the above discussion, the sponsor station 50 never locks-out or times-out a user. Although, a user could in effect by locked-out if no limit is placed on the complexity increases. In any event, an authorized user who has inadvertently entered a wrong password is never prevented from becoming authenticated. When the user remembers or otherwise determines the correct password, the sponsor station 50 will authenticate the user. As discussed above, once a user is authenticated, an indication is stored in the database 1001 that the user has successfully logged in. Therefore, the next time the user attempts to authenticate, the challenge size will be small.

For instance, if the normal computation takes 1 second and the maximum complexity challenge takes 30 seconds, the loss to a legitimate user is 29 seconds. An attacker who could previously try 3600 guesses an hour, and could hence work through a million guesses in about twelve days, now will require almost a full year! This disproportionality between the impact on a legitimate user and an attacker is critical.

The sponsor station 50 may also be configured to reset the indication in the database 1001 of an authentication after a predetermined time period. This time period may be set as desired, but preferably is set at three hours. Thus, an authorized user who unsuccessfully authenticates, but who later remembers or otherwise obtains his or her correct password can immediately be authenticated by the sponsor station 50.

The present invention also protects against those on-line guessing attacks which come from more than one computing device, or from a computing device which can appear as multiple computing devices. Because the database 1001 stores an indication of the failure of the previous attempts at authentication associated with user ID's and passwords, a subsequent attempt at authentication is required to meet a larger challenge, assuming the database has not been reset as described above. Thus, if an attacker attempts four guesses using one computing device and then uses a different computing device, the sponsor station 50 will still present the larger size challenge than that last tried unless an established threshold has already been reached, even though the attacker is using a different computing device, because before any challenge is generated the data base is consulted. Furthermore, if at attacker is attacking with more than one machine at a time, the sponsor station 50 will still present a larger challenge for each subsequent attempt, no matter which machine is in communication with the sponsor station 50 because of the same reason.

It will be recognized by those skilled in the art that, while password throttling has been described in the context of user/sponsor/merchant authentication, the technique is equally applicable to authentication between any two computing devices in any asymmetric or symmetric cryptosystem.

Second Embodiment

Password throttling can also be used to provide enhanced security in the conventional elementary password authentication techniques discussed above. If user device 33 and merchant server 41 are not associated with crypto-keys, merchant server 41 can still authenticate user device 33 without having to use either of the techniques of lock-out or time-out.

The merchant server 41 maintains a database 1101, as depicted in FIG. 9, which contains associated user ID's 1110 and passwords 1115. This database also includes an indication of the number of unsuccessful authentication attempts 1120.

As shown in step 1201 of FIG. 10, a user establishes a communication session with the merchant server 41. Merchant server transmits a request for the user to supply his or her user ID and password, step 1205. The user enters the requested information and transmits the same to the merchant server 41, step 1210. The merchant server accesses the password database 1101 and determines if the password is valid, step 1215. If so, the user is authenticated and granted access to the merchant server. The merchant server 41 sets the indication of the number of unsuccessful authentication attempts 1120 to a value of zero, step 1220. If the merchant server 41 determines that the password is invalid the merchant server 41 increments the indication of number of unsuccessful authentication attempts by a value of one and recalls the newly incremented value, step 1225. The merchant server then accesses a stored list of time periods which are associated with values of the indication of the number of unsuccessful authentication attempts 1120, step 1230. FIG. 11 is a simplified depiction of this list 1301. The list includes time periods 1305 each associated with a value 1310.

The merchant server 41 determines the time period which corresponds with the recalled value, step 1235. The merchant server 41 then waits the determined time value before operations continue, step 1240. After the determined time period has lapsed, the merchant server 41 transmits another request for the user to supply his or her user ID and password, step 1245. Thereinafter, operations continue as described above and depicted beginning at step 1210.

The times stored in list 1301 may be varied by according to the needs and desires of the entity controlling the merchant server 41. As in the first embodiment, a user is never denied an opportunity to attempt to authenticate himself or herself, yet an on-line guessing attack can be foiled. The rate at which an attacker learns if he or she has hit upon a valid password is slowed. Preferably, each subsequent attempt results in a doubling of the time period which must elapse before the merchant server 41 requests that the password and user ID be reentered. Preferably, the increases in the time period only continue up to a pre-established threshold limit. However, as soon as a valid password is received, the user device 33 is granted access to the merchant server 41.

Password throttling in this embodiment also defends against on-line guessing attacks performed from several computing devices, as in this embodiment each attempt at authentication must include referencing the database 1101 to determine the number of previous unsuccessful attempts at authentication.

It will also be recognized by those skilled in the art that, while the invention has been described above in terms of one or more preferred embodiments, it is not limited thereto. Various features and aspects of the above described invention may be used individually or jointly. Further, although the invention has been described in the context of its implementation in a particular environment and for particular purposes, e.g. user authentication, those skilled in the art will recognize that its usefulness is not limited thereto and that the present invention can be beneficially utilized in any number of environments and implementations. Accordingly, the claims set forth below should be construed in view of the full breath and spirit of the invention as disclosed herein.

What is claimed is:

1. A method for authenticating a user, comprising:
    receiving a request for access from a user claiming to be a particular user;
    transmitting a first challenge having a first level of complexity, corresponding to a size of the first challenge, to the user;
    transmitting a response to the transmitted first challenge;
    determining if the transmitted response authenticates the user as the particular user;
    allowing the requested access to the user if the transmitted response authenticates the user; and
    transmitting a second challenge having a second level of complexity, corresponding to a size of the second challenge, the second level of complexity being greater than the first level of complexity, to the user if the transmitted response does not authenticate the user.

2. A method according to claim 1, wherein:
    the first level of complexity corresponds to a length of the first challenge;
    the second level of complexity corresponds to a length of the second challenge; and
    the length of the first challenge is less than the length of the second challenge.

3. A method according to claim 2, further comprising:
    transmitting multiple other challenges, each of the transmitted multiple other challenges having one of a length greater than the length of the immediately proceeding transmitted challenge if the length of the immediately proceeding challenge is less than a maximum length and a length which is equal to the length of the immediately preceding challenge if the length of the immediately preceding challenge is equal to the maximum length.

4. A method according to claim 1, wherein:
    the transmitted response to the transmitted first challenge includes the transmitted first challenge transformed with a first crypto-key; and
    the transmitted response is determined to authenticate the user as the particular user by further transforming the transformed first challenge with a second crypto-key to recover the transmitted first challenge.

5. A method according to claim 4, wherein the first and the second crypto-keys are associated asymmetric crypto-keys.

6. A method for authenticating a user, comprising:
    receiving a request for access from a user claiming to be a particular user;
    transmitting, after passage of a first time period following receipt of the request, a first challenge to the user;
    receiving a response to the transmitted first challenge;
    determining if received response authenticates the user as the particular user;
    allowing the requested access to the user if the received response authenticates the user; and
    transmitting, after passage of a second time period, which is longer than the first time period, following receipt of the response, a second challenge to the user if the received response does not authenticate the user.

7. A method according to claim 6, further comprising:
    transmitting multiple other challenges, each of the transmitted multiple other challenges being transmitted after passage of one of a time period which is longer than the time period at which the immediately proceeding transmitted challenge was transmitted if the time period of the immediately proceeding challenge is less than a maximum time period and a time period which is equal to the time period of the immediately preceding challenge if the time period of the immediately preceding challenge is equal to the maximum time period.

8. A method according to claim 6, wherein:
    the received response to the transmitted first challenge includes the transmitted first challenge transformed with a first crypto-key;
    the received response is determined to authenticate the user as the particular user by further transforming the transformed first challenge with a second crypto-key to recover the transmitted first challenge.

9. A method according to claim 8, wherein the first and the second crypto-keys are associated asymmetric crypto-keys.

10. A method according to claim 6, wherein the particular user has an associated particular password, the received request includes a first password, the first and the second challenges include a request for the user to enter the particular password, the received response includes a second password, the received response is determined to authenticate the user as the particular user if the second password matches the particular password, and further comprising:
    determining that the received first password does not authenticate the user as the particular user.

11. A system for authenticating a user, comprising:
    a communications port configured to receive communications from and to transmit communications to a user; and
    a processor configured (i) to generate a first challenge having a first level of complexity, corresponding to size of the first challenge, responsive to a first communication requesting access from a user claiming to be a particular user which is received via the communications port, (ii) to direct transmission of the generated first challenge to the user via the communications port, (iii) to allow the requested access to the user responsive to a second communication from the user responding to the generated first challenge which is received via the communications port, if the second communication authenticates the user as the particular user, (iv) to generate a second challenge having a second level of complexity, corresponding to a size of the second challenge, the second level of complexity being greater than the first level of complexity, responsive to the second communication, if the second communication does not authenticate the user as the particular user, and (v) to direct transmission of the generated second challenge to the user via the communications port.

12. A system according to claim 11, wherein:

the first level of complexity corresponds to a length of the first challenge;

the second level of complexity corresponds to a length of the second challenge;

the length of the first challenge is less than the length of the second challenge; and the length of the second challenge is no greater than an established maximum length.

13. A system according to claim 11, wherein:

the second communication includes the transmitted first challenge transformed with a first crypto-key;

the processor is further configured to authenticate the user as the particular user by further transforming the second communication with a second crypto-key to recover the transmitted first challenge; and the first and the second crypto-keys are associated asymmetric crypto-keys.

14. A system for authenticating a user, comprising:

a communications port configured to receive communications from and to transmit communications to a user; and a processor configured to (i) to direct transmission of a first challenge via the communications port, responsive to a first communication requesting access from a user claiming to be a particular user which is received via the communications port, after passage of a first time period following the receipt of the first communication, (ii) to allow the requested access to the user, responsive to a second communication from the user responding to the transmitted first challenge which is received via the communications port, if the second communication authenticates the user as the particular user, (iii) to direct transmission of a second challenge via the communications port, responsive to the second communication, after passage of a second time period following the receipt of the second communication which is greater than the first time period, if the second communication does not authenticate the user as the particular user.

15. A networked system for authenticating a user, comprising:

a first network processor configured to transmit a request for access from a user claiming to be a particular user; and a second network processor configured to transmit a first challenge having a first level of complexity, corresponding to a size of the first challenge, to the first network processor responsive to the transmitted request;

wherein the first network processor is further configured to transmit a response to the transmitted first challenge;

wherein the second network processor is further configured (i) to allow the requested access to the user, if the transmitted response authenticates the user as the particular user, and (ii) to transmit a second challenge having a second level of complexity, corresponding to a size of the second challenge, the second level of complexity being greater than the first level of complexity to the first network station, if the transmitted response does not authenticate the user.

16. A networked system according to claim 15, wherein:

the first level of complexity corresponds to a length of the first challenge;

the second level of complexity corresponds to a length of the second challenge;

the length of the first challenge is less than the length of the second challenge; and the length of the second challenge is no greater than an established maximum length.

17. A networked system according to claim 15, wherein:

the first network processor transforms the transmitted first challenge with a first crypto-key to generate the response to the transmitted first challenge;

the second network processor transforms the transmitted response to the transmitted first challenge with a second crypto-key to authenticate the user as the particular user; and the first and the second crypto-keys are associated asymmetric crypto-keys.

18. A networked system for authenticating a user, comprising:

a first network processor configured to transmit a request for access from a user claiming to be a particular user; and a second network processor configured to transmit a first challenge to the first network processor responsive to the transmitted request, after passage of a first time period following receipt of the request;

wherein the first network processor is further configured to transmit a response to the transmitted first challenge;

wherein the second network processor is further configured (i) to allow the requested access to the user, if the transmitted response authenticates the user as the particular user, and (ii) to transmit a second challenge to the first network processor after passage of a second time period, which is longer than the first period, following receipt of the transmitted response, if the transmitted response does not authenticate the user.

* * * * *